(12) United States Patent
Wong

(10) Patent No.: US 8,996,776 B2
(45) Date of Patent: Mar. 31, 2015

(54) COMPUTING DEVICE AND METHOD FOR HOT SWAPPING MEDIA

(75) Inventor: Wingo Yiu Sing Wong, Markham (CA)

(73) Assignee: BlackBerry Limited, Waterool, Ontario (CA)

( * ) Notice: Subject to any disclaimer, the term of this patent is extended or adjusted under 35 U.S.C. 154(b) by 243 days.

(21) Appl. No.: 13/437,062

(22) Filed: Apr. 2, 2012

(65) Prior Publication Data

US 2013/0262728 A1 Oct. 3, 2013

(51) Int. Cl.
*H05K 7/10* (2006.01)
*G06F 13/40* (2006.01)

(52) U.S. Cl.
CPC .................................. *G06F 13/4081* (2013.01)
USPC .......................................... 710/302; 710/300

(58) Field of Classification Search
USPC .................................. 710/300–308, 311–317
See application file for complete search history.

(56) References Cited

U.S. PATENT DOCUMENTS

| | | | |
|---|---|---|---|
| 6,304,454 B1 | 10/2001 | Akamatsu | |
| 6,578,099 B1 * | 6/2003 | Bassman et al. | 710/301 |
| 6,658,507 B1 * | 12/2003 | Chan | 710/100 |
| 6,704,825 B1 * | 3/2004 | Lascu et al. | 710/302 |
| 6,959,349 B2 | 10/2005 | Oh-Yang et al. | |
| 6,974,338 B1 | 12/2005 | Hasegauki | |
| 7,752,490 B2 * | 7/2010 | Abe | 714/6.32 |
| 7,836,238 B2 * | 11/2010 | Freimuth et al. | 710/302 |
| 8,086,774 B2 * | 12/2011 | Ohara | 710/74 |
| 8,239,595 B2 * | 8/2012 | Schubert et al. | 710/105 |
| 2002/0133660 A1 * | 9/2002 | Yamada et al. | 710/301 |
| 2004/0088466 A1 * | 5/2004 | Tang et al. | 710/303 |
| 2006/0136643 A1 * | 6/2006 | Lin et al. | 710/302 |
| 2008/0005439 A1 * | 1/2008 | Matsukuma | 710/302 |
| 2011/0269423 A1 | 11/2011 | Schell et al. | |
| 2012/0317325 A1 * | 12/2012 | Zhang et al. | 710/301 |

FOREIGN PATENT DOCUMENTS

| | | | |
|---|---|---|---|
| EP | 1924067 A1 | 5/2008 | |
| EP | 1973026 A1 | 9/2008 | |

OTHER PUBLICATIONS 3g iphone repair guide http://www.rapidrepair.com/guides/iphone3g/3g iphone repair gide inside view.jpg downloaded Dec. 8, 2011.
iphone-3G-Teardown http://www.ifixit.com/Teardown/iphone-3G-Teardown/600/3 downloaded Dec. 8, 2011.
European Patent Application No. 12162839.0 Search Report dated Oct. 22, 2012; Examiner: Ghidini, Mario.

* cited by examiner

*Primary Examiner* — Raymond Phan
(74) *Attorney, Agent, or Firm* — Perry + Currier, Inc.

(57) ABSTRACT

A computing device and method for hot swapping media are provided. The computing device comprises: a swap media socket; a power supply for powering the swap media socket; a swap media detect apparatus enabled to undergo a state change when swap media removal occurs at the swap media socket; a switch in communication with the swap media detect apparatus, the switch enabled to disconnect the power supply from the swap media socket in response to the state change; and a processor in communication with the swap media detect apparatus, the processor enabled to turn off the power supply in response to the state change.

20 Claims, 8 Drawing Sheets

COMPUTING DEVICE AND METHOD FOR HOT SWAPPING MEDIA

FIELD

The specification relates generally to swap media, and specifically to hot swapping swap media at a computing device.

BACKGROUND

Hot swapping is a technique whereby a user of an electronic device can remove and replace (i.e., "swap") a component (such as a power source or a media component) while the electronic device remains on and active (i.e., "hot"). "Hot swapping" may have a more general meaning of connection or disconnection of system components without disrupting system operations, but as will be used herein, the term will be applied to connection or disconnection of swap media. In general, swap media include any swappable components that include any recorded data or instructions, such as SIM cards, memory cards and the like. Conventional hot swapping of swap media can cause one or more concerns, and to deal with some of these concerns, some electronic devices are designed so that swap media can be removed or inserted with a battery (or other power source) removed. However, removal of the power source can require or result in a full power down and power up of the device. Powering up and powering down can be inconvenient and time-consuming.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
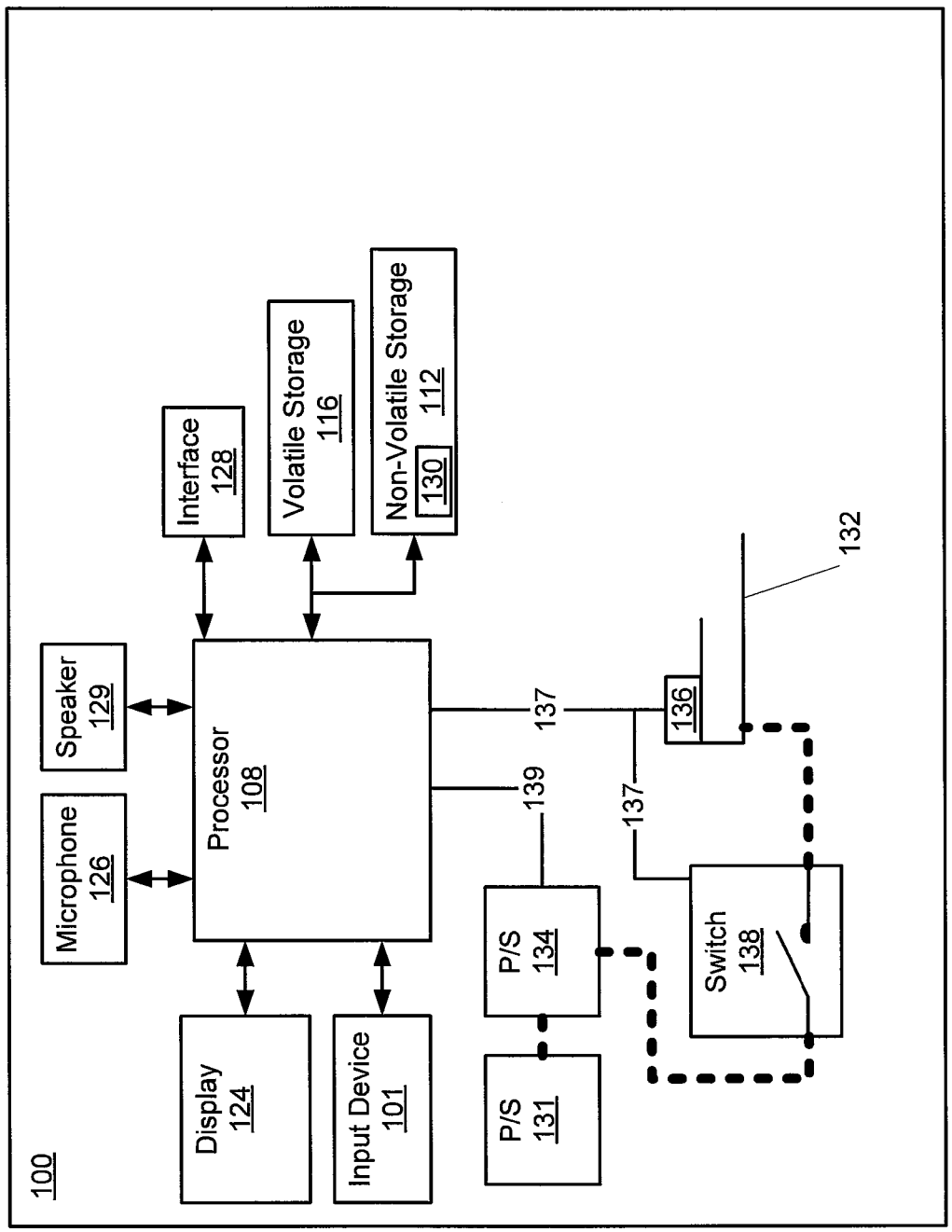
FIG. 1 depicts a device enabled for hot swapping, according to non-limiting implementations.
Figure 2:
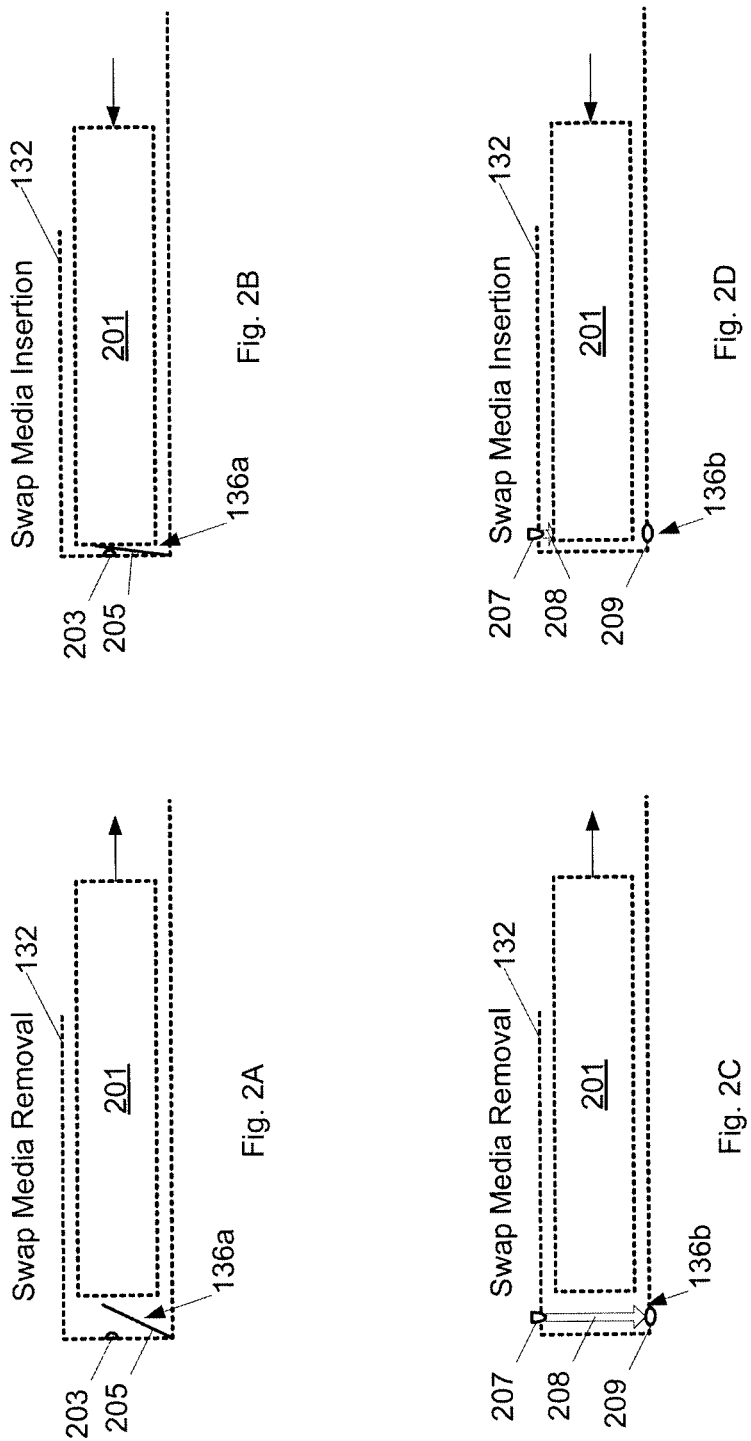
FIGS. 2A and 2B depict an electromechanical apparatus for detecting swap media removal and insertion at a swap media socket of FIG. 1, according to non-limiting implementations.
FIGS. 2C and 2D depict an optical apparatus for detecting swap media removal and insertion at a swap media socket of FIG. 1, according to non-limiting implementations.
Figure 3:
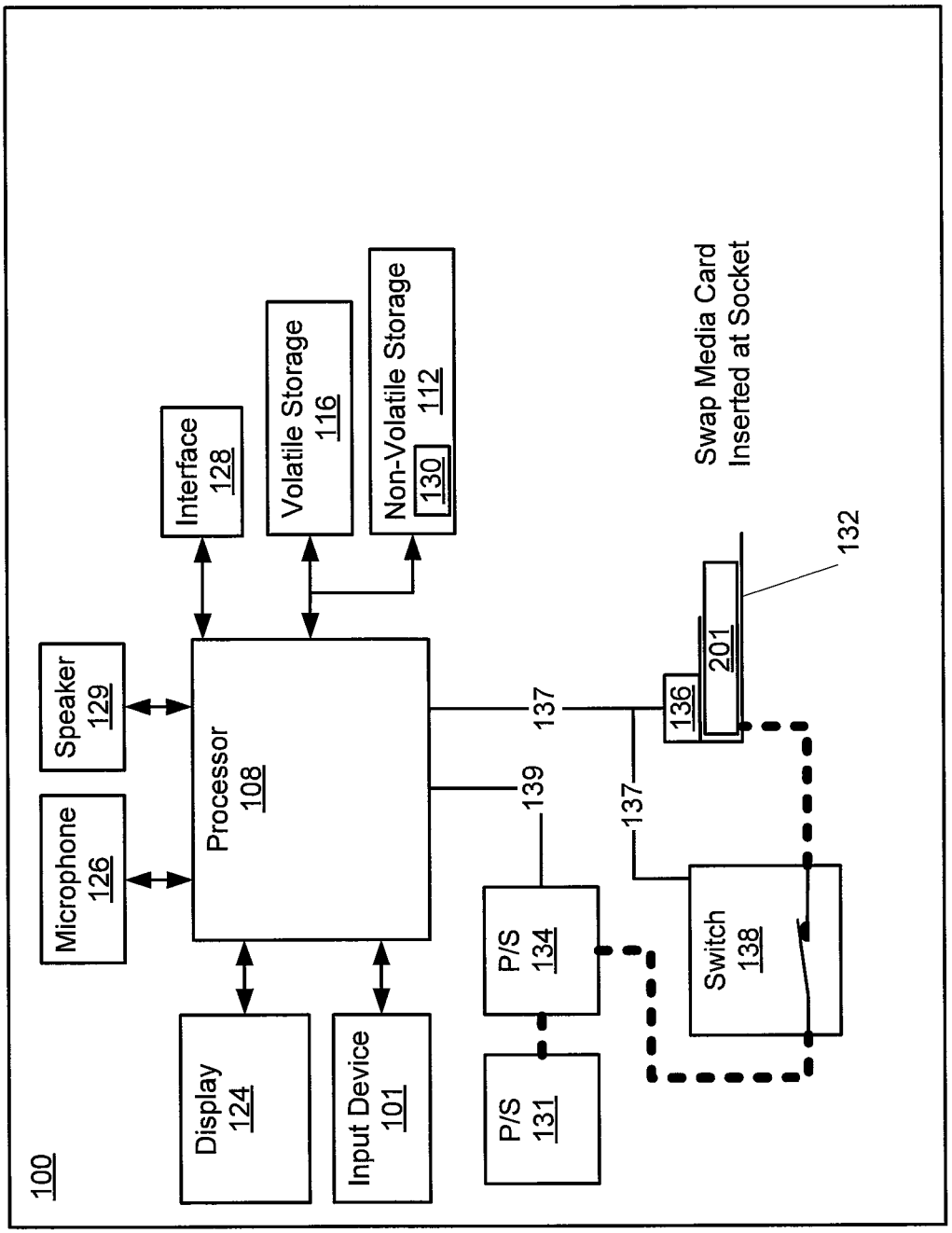
FIG. 3 depicts the device of FIG. 1 with swap media fully inserted at a swap media socket, according to non-limiting implementations.

Hot swapping swap media, by simply removing the swap media while the electronic device remains on and active, can cause one or more concerns. One of those concerns is that damage to the swap media may occur, as contact pads on the swap media may come in contact with powered pins in a swap socket with which the contact pads were not meant to be in contact. Typical damage may include, but need not include, physical destruction; damage may also include loss or scrambling of the data or instructions stored on the swap media, for example, or the generation of false or meaningless signals. Damage can occur when the swap media are removed and when the swap media (or different swap media) are reinserted, or when the swap media are powered up. Described below are methods and apparatus whereby the pins that would otherwise be powered become unpowered during the swap, even though the electronic device as a whole may remain on and active.

An aspect of the specification provides a computing device comprising: a swap media socket; a power supply for powering the swap media socket; a swap media detect apparatus enabled to undergo a state change when swap media removal occurs at the swap media socket; a switch in communication with the swap media detect apparatus, the switch enabled to disconnect the power supply from the swap media socket in response to the state change; and a processor in communication with the swap media detect apparatus, the processor enabled to turn off the power supply in response to the state change. (Generally speaking, when a component is enabled to or enabled for performing a function, the component is capable of performing that function.)

The processor can be further enabled to place the computing device into a removed swap media mode in response to the state change. The removed swap media mode can comprise one or more of an emergency mode, a SOS mode, and a mode where calls can be made via a communication network in the absence of swap media in the swap media socket.

The computing device can further comprise a notification device, wherein the processor can be further enabled to control the notification device to provide an indication of swap media absence in response to the state change.

The notification device can comprise one or more of a display device, a visual indicator, a light, an LED (light emitting diode), an audio indicator, a speaker, and a vibration motor.

The swap media detect apparatus can comprise one or more of a mechanical detection apparatus, an electrical detection apparatus and an optical detection apparatus.

The swap media detect apparatus can be enabled to undergo the change of state when a position of a swap media card at the swap media socket changes from fully inserted to partially inserted.

The switch can comprise one or more of a hardware switch and a FET (field effect transistor) power switch.

The swap media detect apparatus can be further enabled to undergo a second state change when swap media card insertion occurs at the swap media socket; the switch can be further enabled to reconnect the power supply to the swap media socket in response to the second state change; and, the processor can be further enabled to turn on the power supply in response to the second state change, after the switch has reconnected the power supply. The processor can be further enabled to cycle the power supply off and back on until swap media card power up is successfully detected. A delay between a power off and a power can vary for each cycle. The delay between the power off and the power on can one of increase or decrease for each successive cycle. The delay between the power off and the power on can be the same for each successive cycle.

The computing device can further comprise at least one swap media detect line, wherein the switch and the processor are in communication with the swap media detect apparatus via the at least one swap media detect line. The at least one swap media detect line can comprise a hardwire-based line. The at least one swap media detect line can comprise a direct connection between the swap media detect apparatus and the switch. The switch and the processor can respond to the state change via a change in the at least one swap media detect line that occurs in response to the state change at the swap media detect apparatus.

A further aspect of the specification provides a method comprising: determining that a swap media detect apparatus has undergone a state change, the swap media detected apparatus enabled to undergo the state change when swap media removal occurs at a swap media socket in a computing device; and, in response to the state change: disconnecting a power supply from the swap media socket via a switch in communication with the swap media detect apparatus; and turning off the power supply via a processor in communication with the swap media detect apparatus.

The method can further comprise placing the computing device into a removed swap media mode in response to the state change via the processor.

The method can further comprise controlling a notification device at the computing device, via the processor, to provide an indication of swap media absence in response to the state change.

The method can further comprise: determining that the swap media detect apparatus has undergone a second state change, the swap media detected apparatus further enabled to undergo the second state change when swap media card insertion occurs at the swap media socket; and, in response to the second state change: reconnecting the power supply to the swap media socket via the switch; and, turning on the power supply after the switch has reconnected the power supply, via the processor. The method can further comprise cycling, via the processor, the power supply off and back on until swap media card power up is successfully detected. A delay between each cycle can vary between cycles. The delay between the power off and the power on can one of increase or decrease for each successive cycle. The delay between the power off and the power on can be the same for each successive cycle.

FIG. 1 depicts a schematic diagram of a computing device 100 enabled for hot swapping of swap media, according to non-limiting implementations. As will be described below, device 100 is generally enabled to: determine that a swap media detect apparatus has undergone a state change, the swap media detected apparatus enabled to undergo the state change when swap media removal occurs at a swap media socket in device 100; and, in response to the state change: disconnect a power supply from the swap media socket via a switch in communication with the swap media detect apparatus; and turn off the power supply via a processor in communication with the swap media detect apparatus.

Device 100 can be any type of electronic device and includes but is not limited to, any combination of computing devices, personal computers, laptop computers, portable electronic devices, mobile computing device, portable computing devices, tablet computing devices, laptop computing devices, desktop phones, telephones, PDAs (personal digital assistants), cellphones, smartphones, electronic media player, an MP3 player and the like. Other computing devices are within the scope of present implementations. Device 100 may be mobile or portable (readily movable from place to place) and may be handheld (sized and shaped to be held or carried in a human hand). In depicted implementations, device 100 comprises a communication device enabled to interact with a communications network (not depicted).

It should be emphasized that the structure of device 100 in FIG. 1 is purely exemplary, and contemplates a device that can be used for both wireless voice (e.g. telephony) and wireless data communications (e.g. email, web browsing, text, and the like), however in other implementations, device 100 need not be enabled for wireless communications of any kind. For example, device 100 could comprise a portable media player (PMP) and/or digital audio player (DAP) that could be enabled to play electronic media, for example upon insertion of a memory card at a memory socket, the memory card encoded with electronic media files.

In FIG. 1, components can be in communication with one another via data connections, such as a communication bus, and can further be connected via power connections. (Connections may be electronic, physical or mechanical, according to context, and components may be connected via one or more intermediate elements.) To distinguish between the two, in FIG. 1 data communications between components are represented via solid lines and power connections are represented via broken lines. Further, a person of skill in the art would appreciated that the specific implementation of data communications and power connections depicted in FIG. 1 is generally non-limiting, and that device 100 can be configured with many configurations of data communications and power connections. Furthermore, it is appreciated that FIG. 1 does not depict all data communications and power connections between components and other data communications and power connections between components is with the scope of present implementations.

In depicted implementations Device 100 comprises at least one input device 101 generally enabled to receive input data, and can comprise any combination of input devices, including but not limited to a keyboard, a keypad, a pointing device, a mouse, a track wheel, a trackball, a touchpad, a touch screen and the like. Other input devices are within the scope of present implementations.

Input from input device 101 is received at processor 108 (which can be implemented as a plurality of processors, including but not limited to one or more central processing units (CPUs)). Processor 108 is configured to communicate with a non-volatile storage unit 112 (e.g. Erasable Electronic Programmable Read Only Memory ("EEPROM"), Flash Memory) and a volatile storage unit 116 (e.g. random access memory ("RAM")). Programming instructions that implement the functional teachings of device 100 as described herein are typically maintained, persistently, in non-volatile storage unit 112 and used by processor 108 which makes appropriate utilization of volatile storage 116 during the execution of such programming instructions. Non-volatile storage unit 112 and volatile storage 116 are examples of computer readable media that can store programming instructions executable on processor 108. Furthermore, non-volatile storage unit 112 and volatile storage 116 are also examples of memory units and/or memory modules.

Processor 108 in turn can also be configured to communicate with an optional display 124, optional microphone 126 and an optional speaker 129. Display 124, when present, comprises any one of or combination of CRT (cathode ray tube) and/or flat panel displays (e.g. LCD (liquid crystal display), plasma, OLED (organic light emitting diode), capacitive or resistive touchscreens, and the like.

Microphone 126, when present, comprises any microphone or other transducer for converting sound to sound data. Speaker 129, when present comprises any speaker for providing sound data at device 100. It is appreciated that microphone 126 and speaker 129 can be used in combination at device 100 to conduct communications comprising a voice call, for example with a remote communication device.

In some implementations, input device 101 and display 124 are external to device 100, with processor 108 in communication with each of input device 101 and display 124 via a connection and/or link. Similarly, microphone 126 and speaker 129 can be external to device 100, for example integrated into a headset that can be connected to device 100.

Processor 108 can also be enabled to connect to a network communication interface 128, referred to hereafter as interface 128, which can be implemented as one or more radios configured to communicate over link 106. In general, it will be understood that interface 128 is configured to correspond with the network architecture that is used to implement link 106. In other implementations a plurality of links with different protocols can be employed and thus interface 128 can comprise a plurality of interfaces to support each link.

While not depicted, in some implementations, device 100 can further comprise at least one optional notification device comprising one or more of a display device (e.g. display 124), a visual indicator, a light, an LED (light emitting diode), an audio indicator, a speaker (e.g. speaker 129), a vibration motor and the like.

It is further appreciated that non-volatile storage 112 stores an application 130 for managing hot swapping, as will be described in further detail below. Indeed, in discussions of hot swapping to follow, it is assumed that processor 108 is processing application 130.

Device 100 further comprises a power supply 131 for powering device 100. For example, in implementations where device 100 comprises a mobile computing device, device 100 can comprises a battery. The battery may be removable and may be rechargeable. However, power supply 131 can also comprise a power supply connectable to an electrical grid for powering device 100; in other words, power supply 131 can be plugged in at a wall socket using a power cord. Indeed, power supply 131 can be any power supply and/or combination thereof, for powering device 100, including but not limited to any combination of a battery, an AC-to-DC (alternating current to direct current) converter, a capacitor or a fuel cell system.

Device 100 further comprises a swap media socket 132 for accepting and powering swap media (not depicted in FIG. 1, however see FIGS. 2 to 6 below), including but not limited to SIM (subscriber identification module) cards, digital, memory cards, flash memory, SD (secure digital) cards, microSD cards, miniSD cards, PCMCIA (Personal Computer Memory Card International Association) cards, USB (universal serial bus) based cards and the like. Swap media socket 132 will also be referred to as socket 132 hereafter. While not depicted, it is appreciated that socket 132 comprises one or more of pins, contacts, and the like, enabled to contact swap media inserted therein to power swap media. Similarly, socket 132 comprises one or more of pins, contacts, and the like, enabled to contact swap media inserted therein to access memory at the swap media. In hot swapping, upon removal and insertion of swap media from socket 132, when data contacts of the swap media touch power and/or ground contacts of socket 132, the swap media can be damaged. In specific non-limiting implementations, swap media socket 132 can comprise a SIM socket enabled to accept and power a SIM card.

Device 100 further comprises a power supply 134 for powering socket 132. For example, power supply 134 is generally powered by power supply 131 and can be dedicated to powering socket 132. It is appreciated that power supply 134 can be controlled by processor 108 independently of other components of device 100, and further power supply 134 can be turned on and off independent of other components of device 100; hence, turning power supply 134 on and off will not generally affect other components of device 100 other than socket 132. Indeed, it is appreciated that turning power supply 134 off will result in power to socket 132 being turned off and turning power supply 134 on will result in power to socket 132 being turned on. Turning on may include turning on in a controlled fashion, such as by powering up with controlled voltages or currents or signals, or by cycling of power (for example turning off and turning on). In some implementations, processor 108 can turn power supply 134 on and off by transmitting respective signals thereto, with power supply 134 enabled to turn power on and off to socket 132 when receiving such signals. In some implementations, power supply 134 comprises a PMIC (Power Management Integrated Circuit).

For example, in implementations where socket 132 comprises a SIM socket, power supply 134 can comprise a SIM LDO (Low-dropout regulator) for powering the SIM socket. In some implementations, power supply 131 can comprise power supply 134: for example, power supply 134 can be a board at power supply 131 dedicated to powering socket 132.

Device 100 further comprises an apparatus 136 enabled to undergo a state change when swap media removal occurs at the socket 132. In general a state represents a distinct or distinguishable property or condition, or set of properties or conditions. A state change represents assuming a state that is distinct from a previous state. States may have meaning, such as a state of an open switch or circuit on a sensor may correspond to "component absent" while a closed switch or circuit corresponds to "component present." States may be represented as two mutually exclusive conditions such as "open" or "closed"; states may also be represented as more than two conditions, such as "not inserted," "partially inserted" or "fully inserted." Examples of various states and state changes will be explained below.

Device 100 further comprises a switch 138 in communication with the apparatus 136, the switch 138 enabled to disconnect the power supply 134 from the socket 132 in response to the state change at swap media detect apparatus. In some implementations switch 138 comprises one or more of a hardware switch and a FET (field effect transistor) power switch. For clarity, FIG. 1 includes a depiction of a single pole single throw switch at switch 138, however it is appreciated that switch 138 can comprise any switch and the depicted of a single pole, single throw switch is not to be unduly limiting. It is further appreciated, however, that switch 138 can be in communication with apparatus 136 for example via a swap media detect data line 137, referred to hereafter as line 137, and enabled to respond to a state change at apparatus 136. For example, when switch 138 comprises a FET power switch, line 137 can be connected to an Enable/Input pin of the FET power switch such that signals from line 137 can turn switch 138 on and off. For example see the circuit diagram of FIG. 8 described in further detail below. Further, it is appreciated that line 137 can comprise a hardwire-based line, for example a wire and/or a trace between apparatus 136 and switch 138; the trace can be on a circuit board supporting one or more of apparatus 136 and switch 138. Further, line 137 can comprise a direct connection between apparatus 136 and switch 138.

It is further appreciated that as processor 108 is in communication with the apparatus 136, processor 108 is enabled to turn off the power supply 134 in response to the state change. For example, processor 108 can comprise a GPIO (general purpose input/output, not depicted) pin enabled to control power supply 134, for example via data line 139. Turning off switch 138, thereby disconnecting the power supply 134 from the socket 132, may be a faster way to remove power to the socket 132 than turning power supply 134 off; but turning power supply 134 off may have one or more important benefits. As will be discussed below, turning power supply 134 off may support controlled powering up of the media that has been swapped in.

Processor 108 and switch 138 can be in communication with apparatus 136 in any manner, and indeed each can be enabled to respond to changes at apparatus 136 via line 137. Hence, when a state change occurs at apparatus 136, a given change occurs at line 137 which causes switch 138 to open or close, and processor 108 to turn power supply 134 off or on (without necessarily disconnecting or turning off or otherwise changing the operation of power supply 131, such that power to other systems or subsystems is not necessarily affected).

Apparatus 136 can comprise one or more of a mechanical detection apparatus, an electrical detection apparatus and an optical detection apparatus. For example, attention is directed to FIGS. 2A and 2B which schematically depict an electromechanical implementation of an apparatus 136a at socket 132. It is appreciated that swap media apparatus 136 of FIG. 1 can comprise swap media apparatus 136a of FIGS. 2A and 2B.

In FIGS. 2A and 2B, socket 132 is depicted with a swap media card 201, including but not limited to a SIM card, being respectively removed and inserted at socket 132. Further, socket 132 and swap media card 201 are depicted in outline and apparatus 136a is depicted in solid lines for clarity.

In any event, in these implementations, apparatus 136a comprises an electromechanical switch, which in turn comprises a pole 203 and a biased electrically conductive arm 205: in other words a biased single pole single throw switch. While not depicted, one or more of pole 203 and arm 205 can be connected to an electrical circuit, such as line 137. When swap media card 201 is fully inserted into socket 132, as depicted in FIG. 2B, arm 205 is in contact with pole 203 as swap media card 201 biases arm 205 into contact with pole 203. However, when swap media card 201 is at least partially removed from socket 132, as depicted in FIG. 2A, as arm 205 is biased, arm 205 loses contact with pole 203.

In other words, apparatus 136a is enabled to undergo a state change when a position of swap media card 201 at socket 132 changes from fully inserted to partially inserted. Indeed, it is appreciated that apparatus 136a is hence located at an end of socket 132 where a leading edge of swap media card 201 resides when fully inserted at socket 132. However, swap media apparatus 136a can be located at any position with respect to socket 132.

In any event, the state change at apparatus 136a can then be conveyed to both switch 138 and processor 108 via line 137, which in turn respond to a change at line 137. For example, when arm 205 changes from a closed state as in FIG. 2B to an open state as in FIG. 2A, line 137 can indicate that swap media card 201 is no longer fully inserted at socket 132: for example, a given signal can be conveyed on line 137, the given signal indicative that apparatus 136a is in an open state. Hence, in these implementations, line 137 can be connected to power supply 134, pole 203 and arm 205 such that when arm 205 ceases to be in contact with pole 203 a circuit is interrupted and a low signal is conveyed on line 137 causing switch 138 to open and cut power to socket 132 from power supply 134. Similarly, processor 108 detects the low signal and turns power supply 134 off.

Similarly, apparatus 136a is further enabled to undergo a second state change when a position of swap media card 201 at socket 132 changes from partially inserted to fully inserted. The second state change can then be conveyed to both switch 138 and processor 108 via line 137. As will be further explained below, in these implementations, switch 138 and processor 108 also respond to the second state change of apparatus 136 via a second change in line 137 that occurs in response to the second state change at the apparatus 136a. For example, when arm 205 changes from an open state as in FIG. 2A to a closed state as in FIG. 2B, line 137 can indicate that swap media card 201 is fully inserted at socket 132: for example, a second given signal can be conveyed on line 137, the second given signal indicative that apparatus 136a is in a closed state. In other words, apparatus 136a is further enabled to undergo a second state change when swap media card insertion occurs at the socket 132.

For example, line 137 can be connected to power supply 134, pole 203 and arm 205 such that when arm 205 contacts pole 203 a circuit is completed and a high signal is conveyed on line 137 causing switch 138 to close and power socket 132 from power supply 134. Similarly, processor 108 detects the high signal and turns power supply 134 on.

It is appreciated, however that while in depicted implementations apparatus 136a being open or closed is respectively indicative of swap media card removal and insertion, in other electromechanical implementations of apparatus 136, an electromechanical switch being open can indicate swap media card insertion and the electromechanical switch being closed can indicate swap media card removal. Line 137 can be configured accordingly, as can switch 138 and processor 108 and/or connections to switch 138 and processor 108.

Attention is next directed to FIGS. 2C and 2D which schematically depict an optical switch implementation of a apparatus 136b at socket 132. It is appreciated that swap media apparatus 136 of FIG. 1 can comprise swap media apparatus 136b of FIGS. 2C and 2D.

FIGS. 2C and 2D, are respectively similar to FIGS. 2A and 2B, however, in these implementations, apparatus 136b comprises an optical switch, which in turn comprises a light source 207, emitting light 208, and an oppositely disposed light detector 209 for detecting light 208. For example, light source 207 can comprise an LED, and detector 209 can comprise a detector for detecting light 208 from the LED.

While not depicted, detector 209 can be connected to an electrical circuit, such as line 137; detector 209 can be enabled to change state when swap media card 201 changes position from fully inserted (as in FIG. 2D) to partially inserted (as in FIG. 2C). For example, it is appreciated that apparatus 136b is located at an end of socket 132 where a leading edge of swap media card 201 resides when fully inserted at socket 132. However, swap media apparatus 136b can be located at any position with respect to socket 132.

In any event, when swap media card 201 is fully inserted at socket 132, the leading edge of swap media card 201 blocks light 208 from being detected at detector 209, as in FIG. 2D; when swap media card 201 is partially inserted at socket 132, swap media card 201 does not block light 208 from being detected at detector 209, as in FIG. 2C. Hence, detector 209 changes from a no-detected light state in FIG. 2D to a detected light state in FIG. 2C. Similarly, detector 209 undergoes a second state change when detected light state in FIG. 2C to a no-detected light state in FIG. 2C when swap media card 201 is inserted at socket 132.

The state change at apparatus 136b whether due to insertion or removal of swap media card 201, can then be conveyed to both switch 138 and processor 108 via line 137 as described above with respect to swap media detect apparatus 136a.

It is appreciated, however, that the actual nature of the state change at apparatus 136b is generally non-limiting and that any change in state at detector 209 can indicate swap media card insertion and/or swap media card removal.

Furthermore, while specific electromechanical and optical switch implementations of apparatus 136 are described with reference to FIGS. 2A-2D, any swap media detect apparatus is within the scope of the present specification.

Attention is next directed to FIGS. 3 to 6 which are substantially similar to FIG. 1, with like elements having like numbers. However, in FIG. 3, swap media card 201 is depicted in a fully inserted position at socket 132 and switch 138 is depicted as closed. It is further appreciated that power supply 134 is on. Hence, socket 132 is appreciated to be powered, as is swap media card 201.

Figure 4:
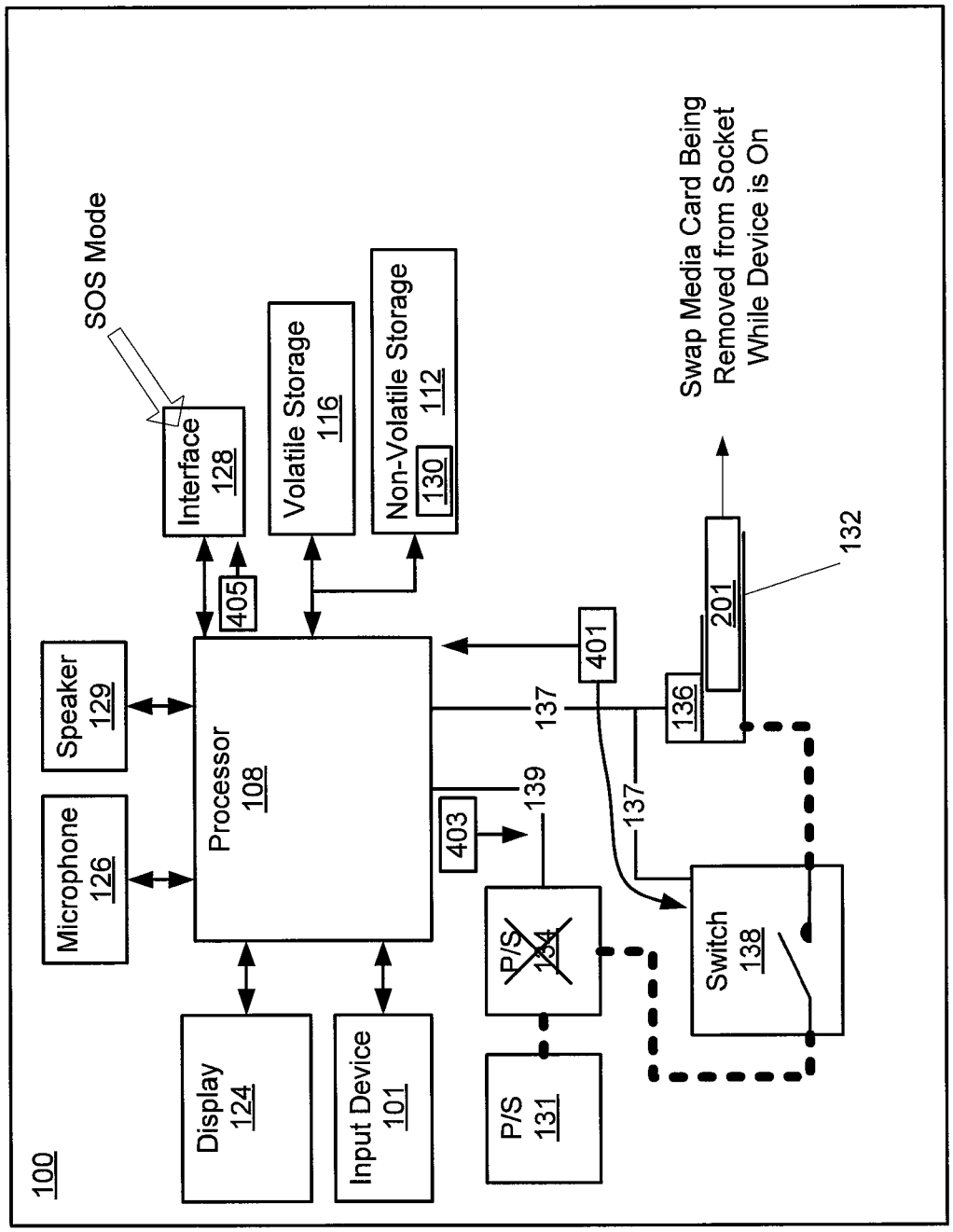
FIG. 4 depicts the device of FIG. 1 with swap media being removed from the swap media socket during a hot swapping event, according to non-limiting implementations.

In FIG. 4, it is appreciated that swap media card 201 is being removed from socket 132 while device 100 is on. In other words a hot swapping event has commenced. As described above, in response to swap media card 201 being removed, apparatus 136 undergoes a state change and the state change is conveyed via signal 401, or the like, at line 137 to switch 138 and processor 108. For example, while swap media card 201 was fully inserted at socket 132, line 137 can have been in a high state; changing a position of swap media card 201 from a fully inserted state to partially inserted state can cause apparatus 136 to respond by changing line 137 from the high state to a low state as indicated by signal 401. Indeed, in these implementations, signal 401 can comprise a change in line 137 from a high state to a low state.

In response to detecting signal 401, switch 138 opens and disconnects power supply 134 from socket 132. Meanwhile, in response to detecting signal 401, processor 108 turns off power supply 134 by transmitting a signal 403 via line 139. As with signal 401, signal 403 can also comprise a change in line 139 from a first state to a second state, where in power supply 134 is on when the first state is detected and turns off when the second state is detected.

As switch 138 opens when swap media card 201 changes from a fully inserted to a partially inserted state at socket 132, and power to socket 132 is hence cut, the chance of data pins on swap media card 201 shorting to powered and/or grounded pins at socket 132 is reduced. Turning power supply 134 off provides a failsafe in the event switch 138 fails to open and further ensures that power to socket 132 is off and socket 132 is ready for swap media insertion as will presently be described. Further, in implementations where device 100 comprises a battery, turning off power supply 134 will reduce current consumption on the battery, increasing battery life.

In other words, present implementations are a combined hardware-software approach to turning power to socket 132 off and on: a hardware approach (line 137 connected to switch 138) is used to open and close switch 138, and software (e.g. application 130) at processor 108 is used to detect the state change at apparatus 136 and in response turn power supply 134 off and on. This addresses a problem of using software only to turn off power supply 134 (e.g. if switch 138 were not present), as the time a processor takes to respond to state change at a data line and turn off a power supply can be longer than the time it takes to remove swap media from a socket. Hence, timing requirements in software for turning power supply 134 off are removed, as switch 138 can power off socket 132 in time for hot swapping to occur. Indeed, use of switch 138 can reduce the amount of time to turn power to switch 132 off to the order of hundreds of microseconds.

In some implementations, processor 108 can be enabled to place device 100 into a removed swap media mode in response to the state change. In general, a mode is a manner of operating, sometimes with various functionality enabled or disabled or prioritized or otherwise modified. A removed swap media mode represents the manner of operating the device 100 while a swap is under way, which is generally distinct from normal operation. As a general matter, in removed swap media mode, one or more functions of device 100 that are dependent upon or that may be affected by removal of the media may be modified in some fashion. For example, the removed swap media mode can comprises one or more of an emergency mode, an SOS mode, and a mode where calls can be made via a communication network in the absence of a swap media in the socket 132. (The emergency mode etc. can also be entered in the absence of functional swap media in the socket 132 i.e. when swap media in the socket is present but not functional). Colloquially speaking, information such as subscriber identity might be needed before a call can be placed during normal operation; but in emergency mode, an emergency call (such as 9-1-1 or 9-9-9) may be placed even if media storing the subscriber identity has been removed. For example, with further reference to FIG. 4, in response to detecting signal 401, processor 108 can control interface 128 to be placed into an SOS mode, such that emergency calls can be made from device 100.

In yet further implementations, processor 108 can control a notification device at device 100 to provide an indication of swap media absence in response to the state change. For example, when swap media comprises a SIM card, text comprising "NO SIM CARD PRESENT", or the like, can be rendered at display 124 and/or speaker 129 can be controlled to provide an audible signal of SIM card absence (e.g. a beeping noise). Any other notification devices that are present can be controlled accordingly (e.g. an LED can blink, a vibration motor can vibrate, and the like). When device 100 is placed into a removed swap media mode, such as an SOS mode, an indication of such can also be rendered at display 124 (e.g. the text "SOS Mode", or the like, and/or an icon indicative of device 100 being in an SOS mode).

Figure 5:
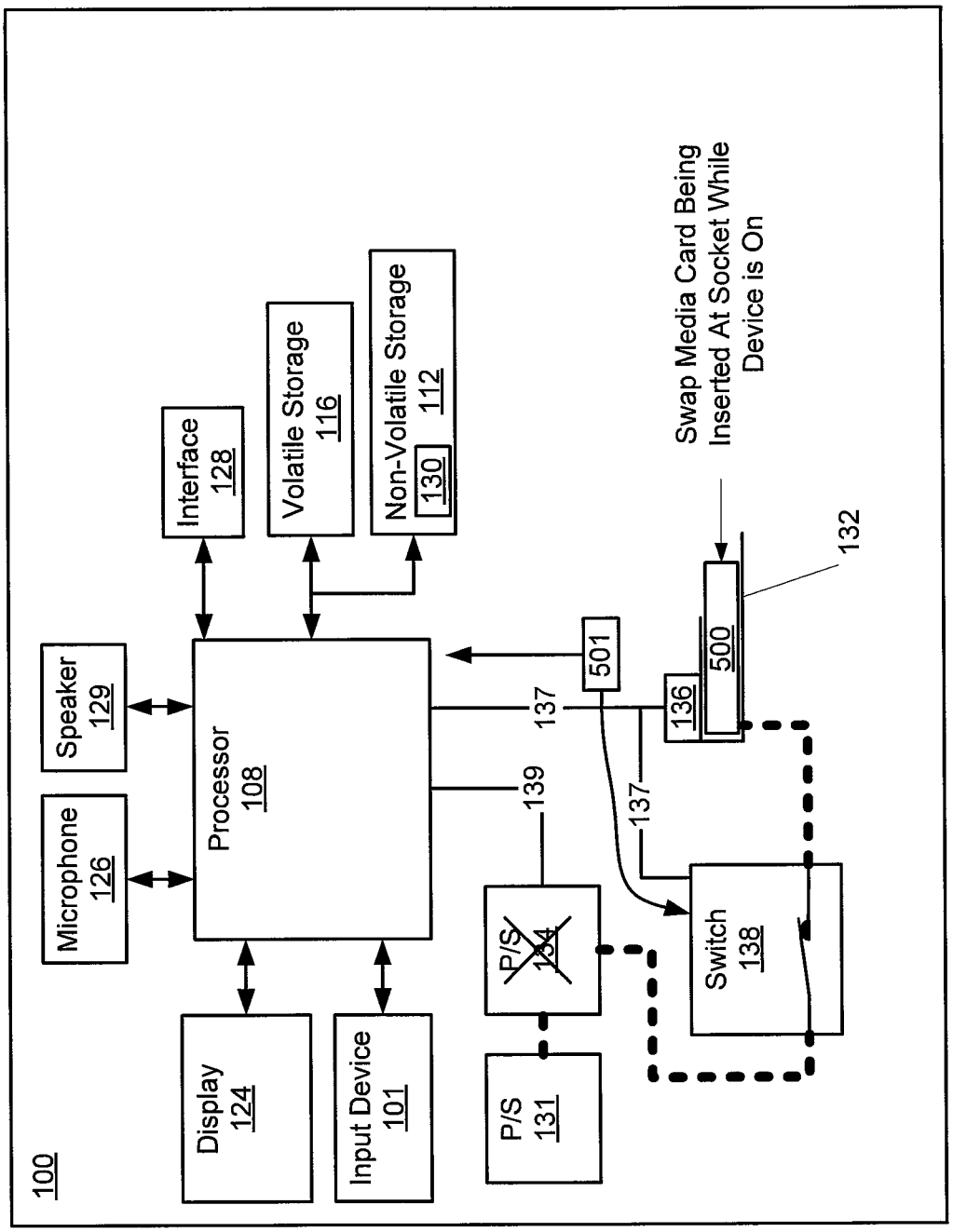
FIGS. 5 and 6 depicts the device of FIG. 1 with swap media being inserted at the swap media socket during a hot swapping event, according to non-limiting implementations.

As has already been discussed apparatus 136 is further enabled to undergo a second state change when swap media card insertion occurs at the socket 132. Indeed, swap media card insertion is depicted at FIG. 5. As hot swapping is occurring, it is appreciated that a different swap media card 500 is being swapped for swap media card 201, swap media card 500 being of a similar type to swap media card 201.

In response, to the second state change at apparatus 136, line 137 undergoes a second change as represented by signal 501. Switch 138 is hence further enabled to reconnect the power supply 134 to the socket 132 in response to the second state change: in other words, switch 138 closes and reconnects power supply 134 to socket 132. However, while processor 108 also detects the change on line 137 as represented by signal 501, power supply 134 is not yet turned back on. Rather, processor 108 takes time to respond to signal 501.

Figure 6:
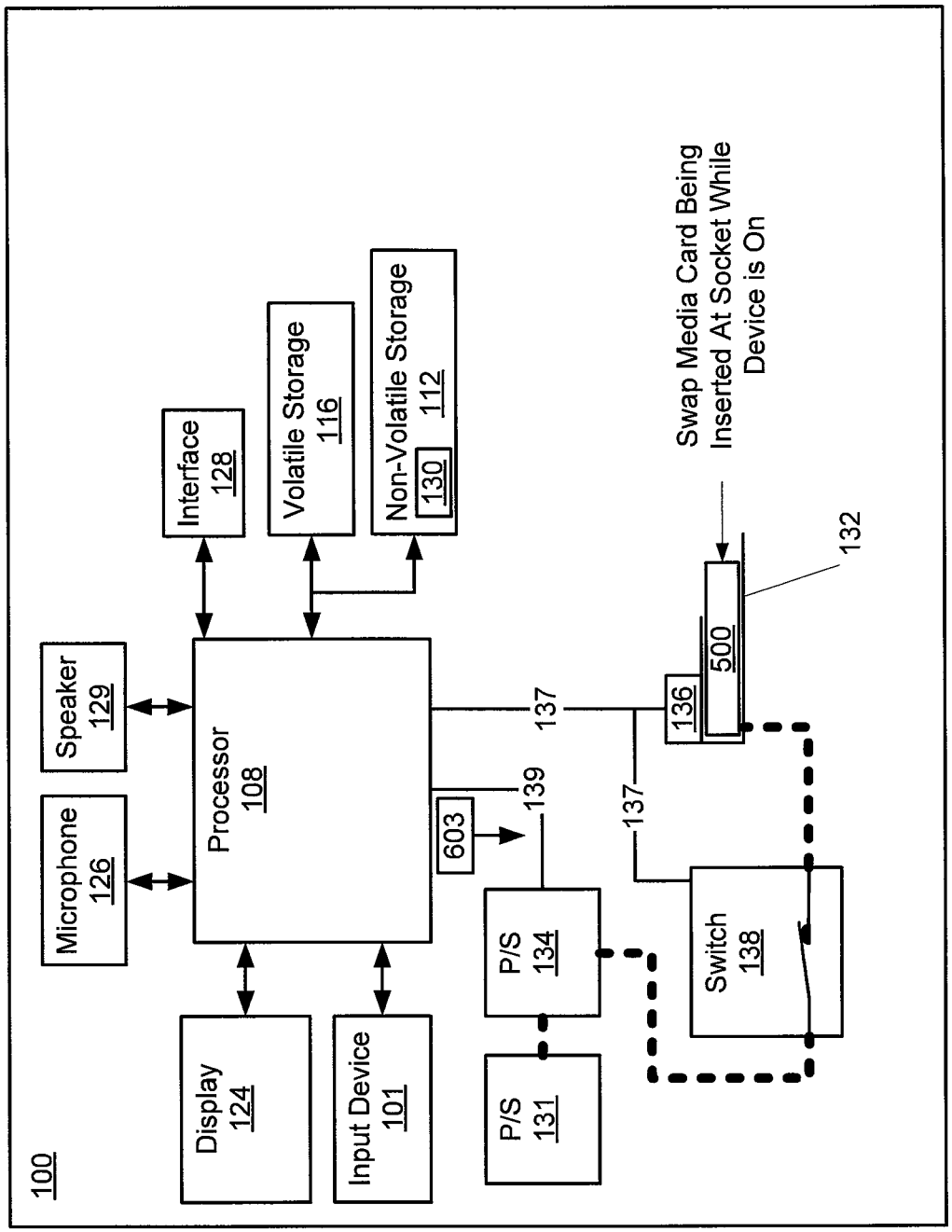

Attention is hence next directed to FIG. 6, which depicts processor 108 transmitting a signal 603 to power supply 134 to turn power supply back on. In other words, processor 108 is further enabled to turn on power supply 134 in response to the second state change, after the switch 138 has reconnected the power supply 134.

In some implementations, the time taken by processor 108 to turn power supply 134 back on comprises the time it takes processor 108 to detect a change on line 137 and turn power supply 134 back on without any deliberate delay: for example, as switch 138 is in communication with apparatus 136, and as switch 138 can be enabled to respond faster to state changes at apparatus 136 than processor 108, processor 108 simply takes more time to turn power supply 134 on than switch 138 takes to close. However, in other implementations, processor 108 can be enabled to delay turning power supply 134 on for a given period of time after signal 501 on line 137 is detected. For example, processor 108 can be programmed to delay turning on power supply 134 for the given period of time, and processor 108 can implement the delay, for example when processing application 130.

In yet further implementations, processor 108 is further enabled to determine whether swap media power card 500 is fully operational upon power up, for example by attempting to access data at swap media card 500. When swap media card 500 is not fully operational, processor 108 can be enabled to cycle power supply 134 off and back on until swap media card 500 power up is successfully detected. In some implementations the delay between the power off and the power on for each cycle can vary to give swap media power card 500 time to recover to a functional state. For example, in some implementations, the delay between each power off and power on can be increased for each successive cycle. However, in other implementations, the delay between each power off and power on can be decreased for each successive cycle. However, the delay between the power off and the power on can be the same for each successive cycle.

Figure 7:
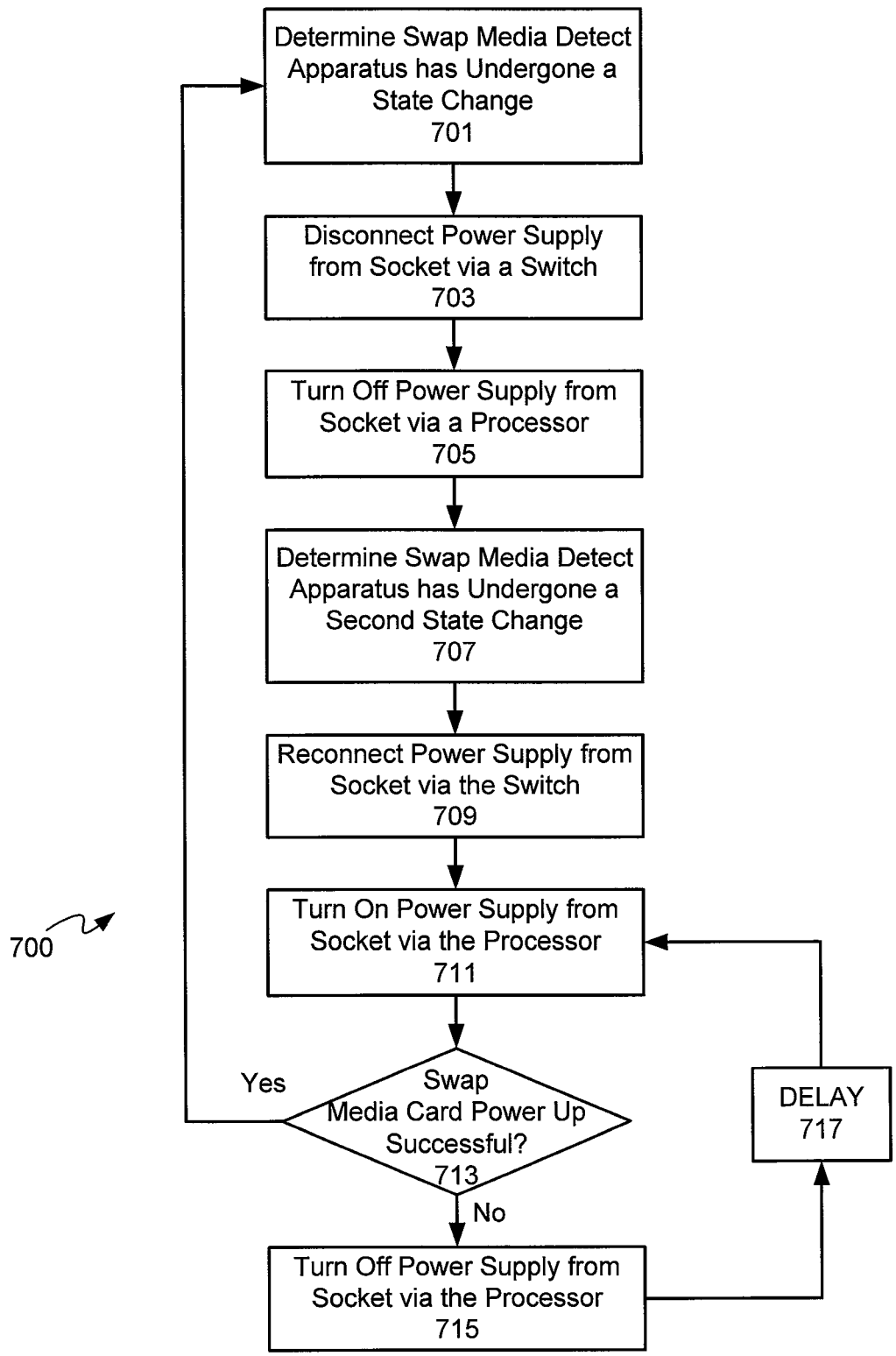
FIG. 7 depicts a method of hot swapping swap media at a computing device, according to non-limiting implementations.

Attention is now directed to FIG. 7 which depicts a method 700 for hot swapping swap media at a computing device, according to non-limiting implementations. In order to assist in the explanation of method 700, it will be assumed that method 700 is performed using device 100. Furthermore, the following discussion of method 700 will lead to a further understanding of device 100 and its various components. However, it is to be understood that device 100 and/or method 700 can be varied, and need not work exactly as discussed herein in conjunction with each other, and that such variations are within the scope of present implementations.

It is appreciated that, in some implementations, method 700 is implemented in device 100 by processor 108 of device 100 processing application 130. Indeed, method 700 is one way in which device 100 can be configured. It is to be emphasized, however, that method 700 need not be performed in the exact sequence as shown; and likewise various blocks may be performed in parallel rather than in sequence; hence the elements of method 700 are referred to herein as "blocks" rather than "steps". It is also to be understood, however, that method 700 can be implemented on variations of device 100 as well.

At block 701, it is determined that swap media detect apparatus 136 has undergone a state change, swap media detected apparatus 136 enabled to undergo the state change when swap media removal occurs at socket 132 in device 100.

At block 703, in response to the state change: power supply 134 is disconnected from socket 132 via switch 138;

At block 705, in further response to the state change, power supply 134 is turned off via processor 108.

In some implementations, method 700 can further comprise one or more of: placing device 100 into a removed swap media mode in response to the state change via processor 108; and controlling a notification device at device 100, via processor 108, to provide an indication of swap media absence in response to the state change. For example, device 100 can be placed into an SOS mode and/or an indication of swap media absence can be rendered at display 124 (e.g. via text "NO SIM CARD PRESENT", or the like).

It is appreciated that blocks 701 to 705 are describe with reference to swap media card removal. Blocks 707 to 711 are next described with reference to swap media insertion.

At block 707, it is determined that swap media detect apparatus 136 has undergone a second state change, swap media detected apparatus 136 further enabled to undergo the second state change when swap media card insertion occurs at socket 132.

At block 709, in response to the state change, power supply 134 is reconnected from socket 132 via switch 138.

At block 711, in further response to the state change, power supply 134 is turned on via processor 108.

In some implementations, at block 713, processor 108 determines whether swap media card power up is successful. When swap media card power up is successful, processor 108 monitors line 137 for the next state change of apparatus 136 and returns to block 701 when the next state change, due to a next hot swapping event.

Otherwise, when swap media card power up is not successful, at block 715 processor 108 turns power supply 134 off, optionally delays at block 717 and block 711 is again implemented. Blocks 711 to 717 can be repeated until media card power up is successfully detected at block 713. When block 717 is implemented, processor 108 can be enabled to vary the delay between cycles.

Figure 8:
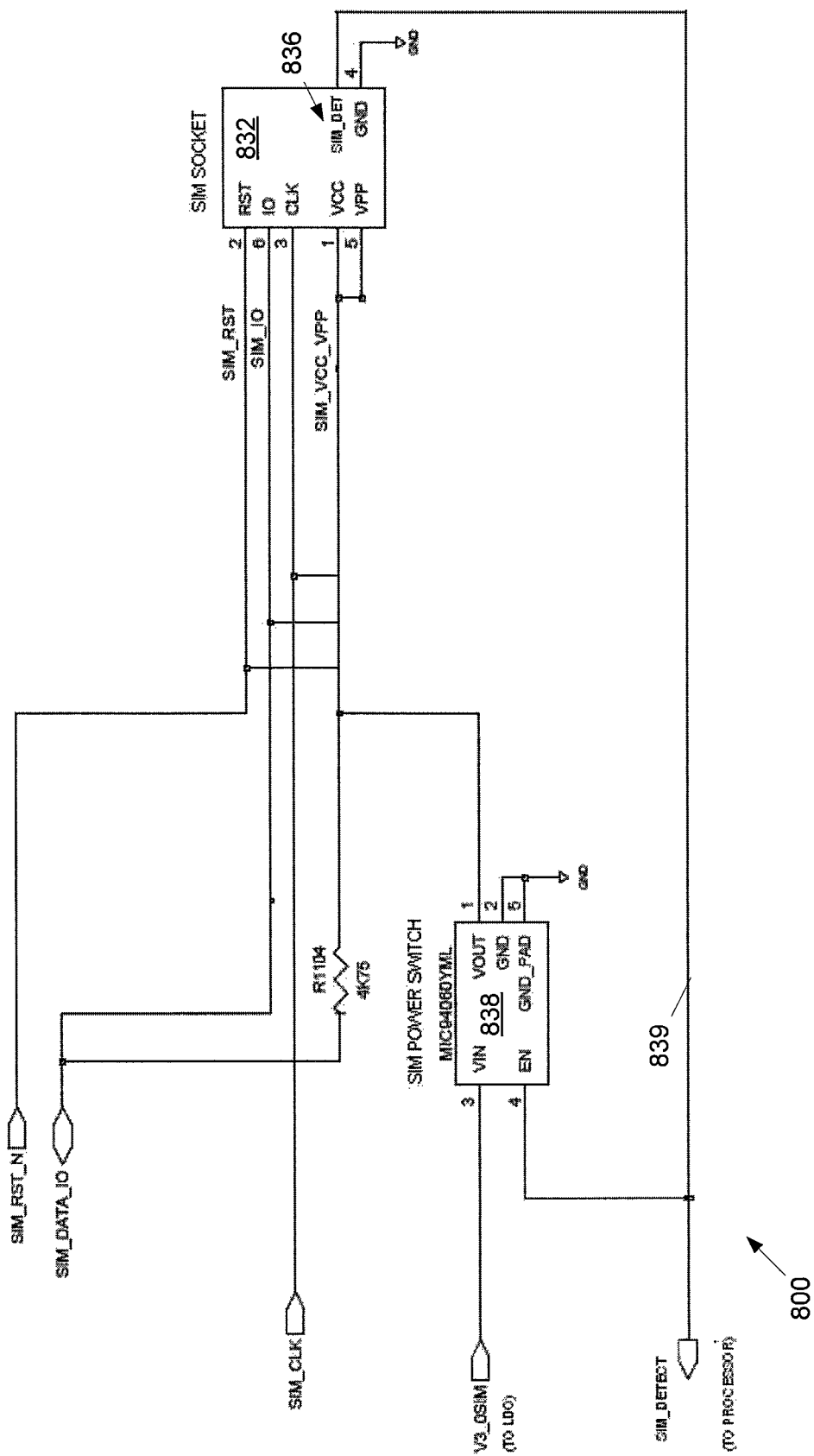
FIG. 8 depicts a circuit for hot swapping, according to non-limiting implementations.

Attention is next directed to FIG. 8, which depicts an example circuit diagram of a circuit 800 for implementing method 800 at device 100 when swap media comprises a SIM card. Circuit 800 comprises a SIM socket 832, a SIM detect apparatus 836 which in these implementations incorporated into SIM socket 832. SIM detect apparatus 836 is in communication with a SIM power switch 838 via SIM detect line 839. SIM socket 832, SIM detect apparatus 836, SIM detect line 839 and SIM power switch 838 each respectively correspond to socket 132, apparatus 136, line 137 and switch 138 described above. SIM detect line 839 is in further communication with a processor (not depicted), corresponding to processor 108, enabled to control a SIM LDO (not depicted), corresponding to power supply 134. Further, SIM power switch 838 connects the SIM LDO to powered pins at SIM socket 832, such that when SIM power switch 838 is open, SIM socket 832 is not powered and when SIM power switch 838 is closed, SIM socket 832 is powered. Hence, when apparatus 836 indicates SIM card removal by undergoing a state change, line 839 is low, and SIM power switch 838 opens, disconnecting the SIM LDO from SIM socket 832. The processor responds to detecting line 839 being low by turning the SIM LDO off. When apparatus 836 indicates SIM card insertion by undergoing a second state change, line 839 is high, and SIM power switch 838 closes, connecting the SIM LDO to SIM socket 832. The processor responds to detecting line 839 being high by turning the SIM LDO on, as described above.

It is further appreciated that circuit 800 further comprises lines for interacting with SIM socket 832, for example to read data from a SIM card inserted therein, and/or to detect successful SIM card power up.

However, it is appreciated that circuit 800 is only one example of an implementation of present implementations, and any suitable circuit can be implemented at device 100.

In any event present implementations address problems introduced by previous device designs where swap media, such as SIM cards, can only be removed or inserted when the battery is removed, which ensures that the device is off when swap media insertion/removal occurs. However, for devices with non-removable batteries, there is a high chance that swap media will be removed and/or inserted when the device is on and active. To prevent damage to the swap media and/or device, present implementations mechanisms ensure that power to a swap media socket (e.g. a SIM socket) is shut off prior to swap media being removed, and to ensure power to swap media socket is not turned back on until the swap media is properly/fully reinserted.

When the detect line indicates swap media is being removed, the switch will shut off, disconnecting the swap media power supply to the swap media (and shutting the swap media card down). The swap media can safely be removed. Meanwhile, the processor also detects the swap media detect line being toggled, and send a command (via software) to the power supply (e.g. to a PMIC chip at the power supply to turn off swap media LDO).

When the swap media detect line indicates that swap media is present, the switch will turn on, connecting the swap media power supply to the swap media. Note that the swap media is not yet powered up as the power supply is not yet turned on. At the same time, the processor also detects swap media detect line is toggled again, and turns on the swap media power supply (and further implements any remainder of a swap media power on sequence) after a short delay. To increase robustness, the processor can attempt to power up the swap media multiple times (with an optionally increasing delay in between) until communications is established with the swap media.

It is appreciated that this is essentially a combined hardware-software approach to turning swap media off and on. The switch frees software and/or the processor from being constrained to the amount of time it takes to turn the swap media power supply off, as the switch ensures the swap media socket and hence the swap media card will be powered off in time.

For swap media power on, it is possible that a swap media card does not successfully power up on a first attempt. Attempting to power up the swap media multiple times will improve the chance that the swap media is powered up successfully.

Present implementations can be used with SIM cards and indeed, swap medium in general. In the past a SIM power line has been directly connected to a SIM LDO. Software controls the SIM power by sending a command to a PMIC to turn the swap media LDO on or off. Due to the non-deterministic nature of software, it is impossible to predict the delay between the processor detecting the change in the swap media detect line and the PMIC turning the swap media LDO off. It is very likely that the swap media LDO will still be on when the swap media card is physically disconnected from the socket. Present implementations ensure power is cut from the SIM card before the SIM card can be removed with a high level of certainty, as SIM card power off is controlled by mechanical and electrical means instead of just by software.

Those skilled in the art will appreciate that in some implementations, the functionality of device 100 can be implemented using pre-programmed hardware or firmware elements (e.g., application specific integrated circuits (ASICs), electrically erasable programmable read-only memories (EEPROMs), etc.), or other related components. In other implementations, the functionality of device 100 can be achieved using a computing apparatus that has access to a code memory (not shown) which stores computer-readable program code for operation of the computing apparatus. The computer-readable program code could be stored on a computer readable storage media which is fixed, tangible and readable directly by these components, (e.g., removable diskette, CD-ROM, ROM, fixed disk, USB drive). Furthermore, it is appreciated that the computer-readable program code can be stored as a computer program product comprising a computer usable media. Further, a persistent storage device can comprise the computer readable program code. It is yet further appreciated that the computer-readable program code and/or computer usable media can comprise a non-transitory computer-readable program code and/or non-transitory computer usable media. Alternatively, the computer-readable program code could be stored remotely but transmittable to these components via a modem or other interface device connected to a network (including, without limitation, the Internet) over a transmission media. The transmission media can be either a non-mobile media (e.g., optical and/or digital and/or analog communications lines) or a mobile media (e.g., microwave, infrared, free-space optical or other transmission schemes) or a combination thereof.

One or more implementations of the concepts described herein may realize one or more benefits, some of which have been described already. In addition to general added convenience and reduced risk of damage or disruption of functions during removal and during replacement of swap media, the concepts are adaptable to a variety of electronic devices and media. The power supply for powering the swap media socket may be deactivated (disconnected or turned off or both) without affecting power to the device as a whole or power to other systems or subsystems. In some circumstances, media may be swapped without causing a complete shutdown of the device. Further, media may be powered up under controlled conditions. Furthermore, deactivating the power supply for powering the swap media in response to the state change when swap media removal occurs at the swap media socket places the media socket into a safe state for reinsertion of the swap media, which acts as a backup to the disconnection of the switch from the swap media socket: if the switch is reconnected before reinsertion, deactivating the power supply ensures that the swap media is not damaged when reinserted. Many implementations may be enabled with little or no addition of size or weight, which may be beneficial for portable devices in general and handheld devices in particular.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A computing device comprising:
a swap media socket;
a power supply for powering the swap media socket;
a swap media detect apparatus configured to undergo a state change when swap media removal occurs at the swap media socket;
a switch in communication with the swap media detect apparatus;
at least one swap media detect line comprising a direct connection between the swap media detect apparatus and the switch, the direct connection configured to communicate a signal indicative of the state change directly from the swap media detect apparatus to the switch, the switch configured to disconnect the power supply from the swap media socket in response to receiving the signal from the direct connection; and
a processor in communication with the swap media detect apparatus, the processor configured to turn off the power supply in response to the state change.

2. The computing device of claim 1, wherein the processor is further configured to place the computing device into a removed swap media mode in response to the state change.

3. The computing device of claim 1, further comprising a notification device, wherein the processor is further configured to control the notification device to provide an indication of swap media absence in response to the state change.

4. The computing device of claim 1, wherein the swap media detect apparatus comprises one or more of a mechanical detection apparatus, an electrical detection apparatus and an optical detection apparatus.

5. The computing device of claim 1, wherein the swap media detect apparatus is configured to undergo the change of state when a position of a swap media card at the swap media socket changes from fully inserted to partially inserted.

6. The computing device of claim 1, wherein the switch comprises one or more of a hardware switch and a FET (field effect transistor) power switch.

7. The computing device of claim 1, wherein:
the swap media detect apparatus is further configured to undergo a second state change when swap media card insertion occurs at the swap media socket;
the switch is further configured to reconnect the power supply to the swap media socket in response to the second state change; and,
the processor is further configured to turn on the power supply in response to the second state change, after the switch has reconnected the power supply.

8. The computing device of claim 1, wherein the switch and the processor are in communication with the swap media detect apparatus via the at least one swap media detect line.

9. The computing device of claim 2, wherein the removed swap media mode comprises one or more of an emergency mode, an SOS mode, and a mode where calls can be made via a communication network in the absence of swap media in the swap media socket.

10. The computing device of claim 3, wherein the notification device comprises one or more of a display device, a visual indicator, a light, an LED (light emitting diode), an audio indicator, a speaker, and a vibration motor.

11. The computing device of claim 7, wherein the processor is further configured to cycle the power supply off and back on until swap media card power up is successfully detected.

12. The computing device of claim 11, wherein a delay between a power off and a power on varies for each cycle.

13. The computing device of claim 12, wherein the delay between the power off and the power on one of increases or decreases for each successive cycle.

14. The computing device of claim 8, wherein the switch and the processor respond to the state change via a change in the at least one swap media detect line that occurs in response to the state change at the swap media detect apparatus.

15. A method comprising:
determining that a swap media detect apparatus has undergone a state change, the swap media detected apparatus configured to undergo the state change when swap media removal occurs at a swap media socket in a computing device; and, in response to the state change:
disconnecting a power supply from the swap media socket via a switch in communication with the swap media detect apparatus via at least one swap media detect line comprising a direct connection between the swap media detect apparatus and the switch, the direct connection configured to communicate a signal indicative of the state change directly from the swap media detect apparatus to the switch, the switch configured to disconnect the power supply from the swap media socket in response to receiving the signal from the direct connection; and
turning off the power supply via a processor in communication with the swap media detect apparatus.

16. The method of claim 15, further comprising placing the computing device into a removed swap media mode in response to the state change via the processor.

17. The method of claim 15, further comprising controlling a notification device at the computing device, via the processor, to provide an indication of swap media absence in response to the state change.

18. The method of claim 15, further comprising:
determining that the swap media detect apparatus has undergone a second state change, the swap media detected apparatus further configured to undergo the second state change when swap media card insertion occurs at the swap media socket; and, in response to the second state change:
reconnecting the power supply to the swap media socket via the switch; and,
turning on the power supply after the switch has reconnected the power supply, via the processor.

19. The method of claim 18, further comprising cycling, via the processor, the power supply off and back on until swap media card power up is successfully detected.

20. The method of claim 19, wherein a delay between each cycle varies between cycles.

* * * * *

UNITED STATES PATENT AND TRADEMARK OFFICE
CERTIFICATE OF CORRECTION

| | | |
|---|---|---|
| PATENT NO. | : 8,996,776 B2 | Page 1 of 1 |
| APPLICATION NO. | : 13/437062 | |
| DATED | : March 31, 2015 | |
| INVENTOR(S) | : Wingo Yiu Sing Wong | |

It is certified that error appears in the above-identified patent and that said Letters Patent is hereby corrected as shown below:

ON THE TITLE PAGE

ITEM 73

"Waterool" should read --Waterloo--.

Signed and Sealed this
Twenty-ninth Day of December, 2015

Michelle K. Lee
*Director of the United States Patent and Trademark Office*